US010627014B1

(12) United States Patent
Daigle et al.

(10) Patent No.: US 10,627,014 B1
(45) Date of Patent: Apr. 21, 2020

(54) ANTI-CORKSCREWING CASING SPACER

(71) Applicants: Damian Daigle, Rayne, LA (US);
Joseph E. Wilson, Lafayette, LA (US);
Miguel Regato, Youngsville, LA (US);
Tom Forlander, Lafayette, LA (US)

(72) Inventors: Damian Daigle, Rayne, LA (US);
Joseph E. Wilson, Lafayette, LA (US);
Miguel Regato, Youngsville, LA (US);
Tom Forlander, Lafayette, LA (US)

( * ) Notice: Subject to any disclaimer, the term of this patent is extended or adjusted under 35 U.S.C. 154(b) by 0 days.

(21) Appl. No.: 16/602,021

(22) Filed: Jul. 22, 2019

Related U.S. Application Data

(63) Continuation-in-part of application No. 15/164,868, filed on May 25, 2016, now abandoned.

(51) Int. Cl.
*F16L 3/12* (2006.01)
*F16L 7/00* (2006.01)

(52) U.S. Cl.
CPC .. *F16L 3/12* (2013.01); *F16L 7/00* (2013.01)

(58) Field of Classification Search
CPC ............. B62B 2301/046; Y10T 16/196; Y10T 16/195; F16L 7/00
USPC ....... 138/112, 113, 108, 110; 16/35 D, 35 R, 16/29, 30; 248/49, 55
See application file for complete search history.

(56) References Cited

U.S. PATENT DOCUMENTS

| | | | |
|---|---|---|---|
| 1,122,130 A | 12/1914 | Lamson | |
| 1,906,209 A | 4/1933 | Harding et al. | |
| 2,531,658 A | 11/1950 | Walsh | |
| 2,706,496 A | 4/1955 | Bond | |
| 3,609,603 A * | 9/1971 | Lutchansky | H01P 1/00 333/239 |
| 3,725,567 A | 4/1973 | Olsen et al. | |
| 3,786,379 A | 1/1974 | Lutchansky | |
| 3,916,081 A * | 10/1975 | Floessel | H02G 5/066 174/28 |
| 4,335,267 A | 6/1982 | Hopkins | |
| 5,441,082 A | 8/1995 | Eskew et al. | |
| 5,791,380 A * | 8/1998 | Onan | C04B 28/02 138/149 |
| 6,003,559 A | 12/1999 | Baker | |
| 6,571,832 B1 | 6/2003 | Elliott | |
| 6,736,166 B2 | 5/2004 | Calais et al. | |
| 7,647,947 B1 | 1/2010 | Littlebrant | |

* cited by examiner

*Primary Examiner* — Patrick F Brinson
(74) *Attorney, Agent, or Firm* — Greg Mier

(57) ABSTRACT

A casing spacer which allows for the positioning of a carrier pipe or set of carrier pipes in a desirable location inside a casing pipe.

32 Claims, 4 Drawing Sheets

ANTI-CORKSCREWING CASING SPACER

CROSS REFERENCE TO RELATED APPLICATIONS

The present application claims priority from non-provisional patent application Ser. No. 15/164,868, filed on May 25, 2016.

The present application claims priority from provisional patent application No. 62/166,098, filed on May 25, 2015.

FIELD OF THE INVENTION

The subject invention relates generally to spacers for positioning pipe within casing pipe. More particularly, the subject invention relates to a casing spacer equipped with anti-corkscrewing mechanisms to prevent a carrier pipe or set of carrier pipes from twisting inside a casing pipe.

BACKGROUND

The term "carrier pipe" describes a pipe used to transport fluids from one place to another. Carrier pipes can be used to transport a wide range of fluids, including petroleum products, chemicals, gases, water, and waste streams. Carrier pipes are typically, but not always, installed underground (under roads, railways, canals, rivers, etc.) where they can be exposed to dynamic and static loads, corrosive elements, vibrations, and other stressful forces. To prevent these stressful forces from damaging carrier pipes and, thus, to prolong the serviceability of carrier pipes, carrier pipes are often installed inside a casing pipe.

A casing pipe is a pipe in which a carrier pipe or a plurality of carrier pipes is/are installed. A casing pipe typically has an inner diameter long enough to create an annulus between the casing pipe and the carrier pipe or plurality of carrier pipes installed inside the casing pipe.

When a carrier pipe or plurality of carrier pipes is/are installed inside a casing pipe, it is often desirable to maintain the carrier pipe or plurality of carrier pipes at a desired position or alignment along the length of the casing pipe, or in the case of gravity flow lines, to maintain the carrier pipe at a desired grade or position along the length of the casing pipe. Casing spacers have been invented for this purpose. In addition, casing spacers serve the purpose of electrically isolating the carrier pipe from the casing pipe to eliminate galvanic corrosion between two dissimilar metals. Where a plurality of carrier pipes is installed inside the casing pipe, casing spacers serve the purpose of electrically isolating each carrier pipe from the other carrier pipes and the casing pipe. Different types of casing spacers are equipped to support a single carrier pipe or a plurality of carrier pipes.

In the case of a single carrier pipe, a conventional casing spacer typically includes a band that is secured around the carrier pipe. Attached to the band is a plurality of risers or supports that extend outward from the surface of the band. In the case of a plurality of carrier pipes, a conventional casing spacer is a sheet of material having multiple holes and cutouts in which the plurality of carrier pipes are placed. In all cases, the casing spacers are typically placed at desired locations along the length of the carrier pipe or plurality of carrier pipes to support the carrier pipe or plurality of carrier pipes along the length of the casing pipe.

In a typical installation of a carrier pipe or a plurality of carrier pipes into a casing pipe, the string of carrier pipes or plurality of carrier pipes are either pushed or pulled into the casing pipe. During the installation process, the string of carrier pipes or plurality of carrier pipes may tend to twist or corkscrew as it is being pushed or pulled into the casing pipe. There are devices that have been designed to prevent or limit the twisting or corkscrewing of the string of carrier pipes or plurality of carrier pipes, but as discussed in further detail below, the present invention for preventing or limiting the twisting or corkscrewing effect is a component of the casing spacer.

BRIEF DESCRIPTION OF THE ATTACHED DRAWING

The accompanying drawings are provided for the purpose of illustration only and are not intended as a definition of the limits of the present invention. The drawings illustrate a preferred embodiment of the present invention.

DESCRIPTION OF THE INVENTION

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof).

The present invention allows for the positioning of a carrier pipe or a set of carrier pipes in a desirable location inside a casing pipe. Existing casing spacers that are commercially available are not equipped with mechanisms that prevent the carrier pipe or set of carrier pipes from twisting, or "corkscrewing," as it is pushed into the casing. There are some secondary methods in the industry, such as welding rails inside the casing to guide the carrier pipe. Such methods result in high labor costs and are impractical with small casing sizes. In addition, such methods do not provide the electrical isolation that most customers need between the casing and carrier pipes.

Figure 1:
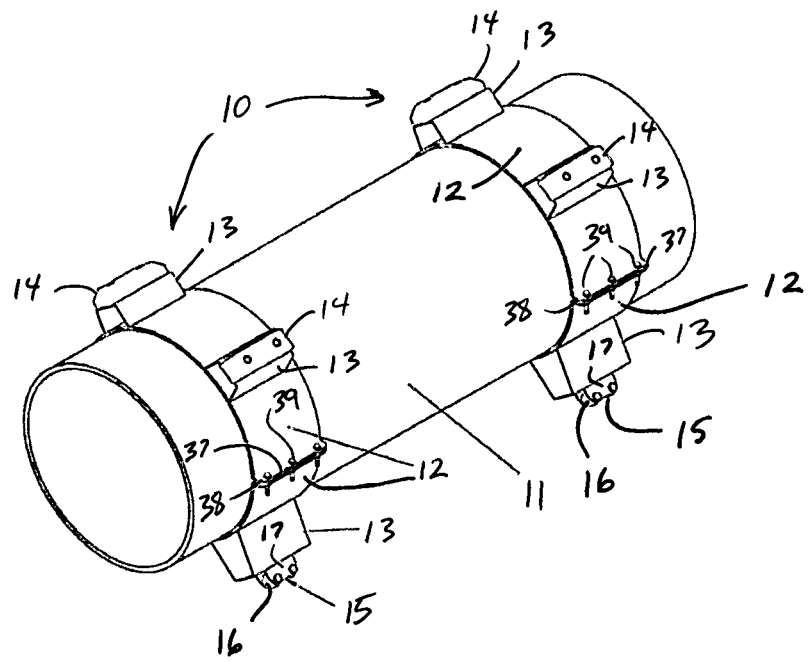
FIG. 1 is a perspective view of two anti-corkscrewing casing spacers installed on a carrier pipe.

FIG. 1 shows two casing spacers 10 on a carrier pipe 11. Each casing spacer 10 includes a casing spacer band 12, multiple risers 13, multiple runners 14, and multiple roller assemblies 15. As shown in FIG. 1, the roller assemblies 15 are designed to be used at the end of a riser 13 on a casing spacer band 12. However, if the annular space between the carrier pipe 11 and the casing pipe is limited, then the roller assemblies 15 can be connected directly to the casing spacer band 12 without a riser 13.

Casing spacer band 12 is preferably formed from a sheet of metal, such as raw steel or stainless steel, but can be made of other materials, such as plastic. If the casing spacer band 12 is formed from a sheet of metal, then the thickness of the sheet of metal is preferably fourteen gauge, but the thickness can vary depending on the size of casing spacer 10. The width of casing spacer band 12 is preferably between eight and twelve inches, but the width can vary depending on the size of carrier pipe 11 on which casing spacer 10 will be installed. Casing spacer band 12 preferably includes two or more sections, depending on the size of carrier pipe 11 on which casing spacer 10 will be installed. Each section of casing spacer band 12 is preferably rolled to give it a semi-circular shape to fit on carrier pipe 11, as shown in FIG. 1. Each short end 37 of the semi-circular section of casing spacer band 12 is preferably bent and formed into a flange 38 with holes (not shown) to receive fasteners 39 to join adjacent semi-circular sections of casing spacer band 12 around carrier pipe 11, as shown in FIG. 1.

Figure 2:
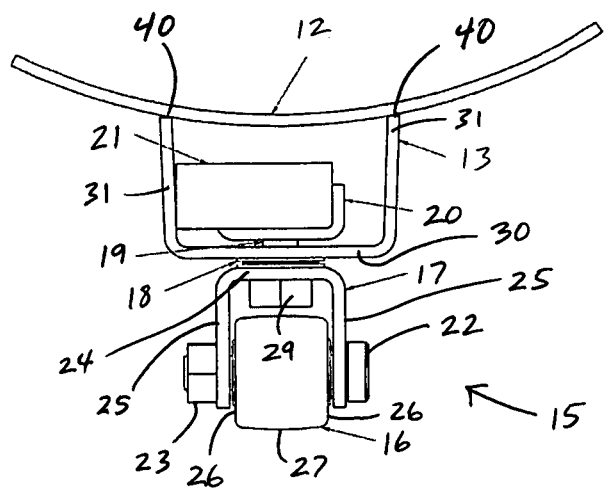
FIG. 2 is a front view of a roller assembly of a first embodiment of the anti-corkscrewing casing spacer installed on a carrier pipe.

Each riser 13 is preferably formed from a sheet of metal, such as raw steel or stainless steel. However, each riser 13 can be formed or molded from other materials, such as plastic. Each riser 13 preferably has a top 30 and two sides 31, as shown in FIG. 2. The width of each riser 13 is preferably substantially equal to the width of casing spacer band 12 on which riser 13 will be or is installed. The purpose of multiple risers 13 is to keep carrier pipe 11 or set of carrier pipes 11 at a desired location inside a casing pipe. As such, the height of multiple risers 13 will depend on the desired location of carrier pipe 11 or set of carrier pipes 11 inside the casing pipe. The free end 40 of each of the two sides 31 of each riser 13 is attached to casing spacer band 12 at various points around the circumference of casing spacer band 12, as shown in FIGS. 1 and 2.

The first embodiment of roller assembly 15 is shown in FIGS. 1 through 5 and 7. The primary components of the first embodiment of roller assembly 15 include one or more wheels 16, a bracket 17, a thrust bearing assembly 18, a pivot connection 19, a pivot limiter 20, and a spring 21.

Figure 7:
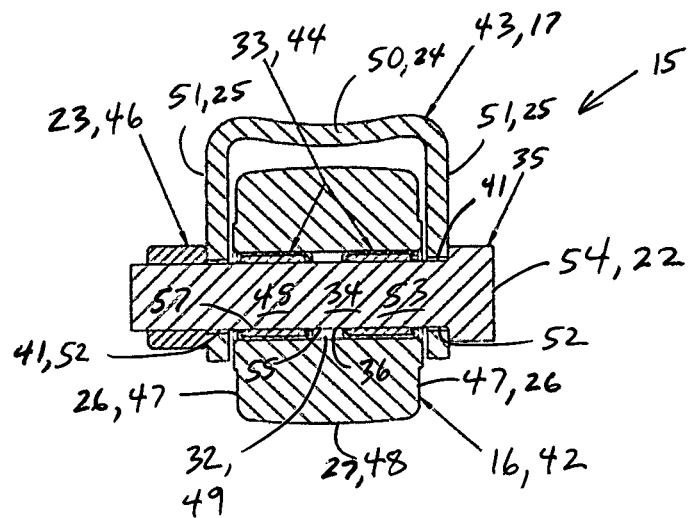
FIG. 7 is a front, cut-away view of a roller assembly for a second embodiment of the anti-corkscrewing casing spacer.

Each wheel 16 of the first embodiment of roller assembly 15 is preferably made of an electrically isolating glass-filled polymer material using injection molding or some other molding process. As shown in FIGS. 2 and 7, each wheel 16 preferably has two sides 26 and a rolling surface 27. As shown in FIG. 7, each wheel 16 is preferably equipped with a bore 57, an inner surface 32, and needle bearings 33. Needle bearings 33 can be used in pairs or alone, depending on the weight of the load to be supported by roller assembly 15.

As shown in FIGS. 2 and 7, bracket 17 preferably has a U-shaped cross-section with a top 24 and two sides 25. Bracket 17 can be made from a sheet of metal such as raw steel or stainless steel. Bracket 17 can be cut or punched from the sheet of metal in the desired shape and then formed or bent into a U-shaped channel having a top 24 and two sides 25, as shown in FIGS. 2 and 7. Bracket 17 can also be made from three separate pieces of metal that are joined together into a U-shaped channel by welding or similar method. Bracket 17 is preferably shaped to provide adequate clearances between bracket 17 and the sides 26 and rolling surface 27 of each wheel 16, as shown in FIGS. 2 and 7. Sides 25 of bracket 17 have holes 41 to accommodate a bolt 22 for each wheel 16 assembled onto bracket 17.

As shown in FIGS. 2, 3, 5, and 7, each wheel 16 is assembled onto bracket 17 using a bolt 22 and a nut 23. Bolt 22 and nut 23 are preferably manufactured from metal, such as carbon steel or stainless steel. Bolt 22 has a shaft 34 for inserting through the sides 25 of bracket 17 and through wheel 16. For each wheel 16 assembled onto bracket 17, shaft 34 of bolt 22 is inserted through a hole 41 in one of the sides 25 of bracket 17, then through wheel 16 so that the set of needle bearings 33 are between bolt 22 and inner surface 32 of wheel 16, and then through a hole 41 in the other side 25 of bracket 17. Shaft 34 is preferably threaded at its end so that nut 23 can be threaded onto shaft 34 to secure bolt 22 to bracket 17. Shaft 34 is preferably unthreaded between its threaded portion and the head 35 of bolt 22 to provide an unthreaded rolling surface 36 for set of needle bearings 33. Unthreaded rolling surface 36 of shaft 34 of bolt 22 should be hard enough to prevent excessive wear from the rolling of the set of needle bearings 33.

Figure 4:
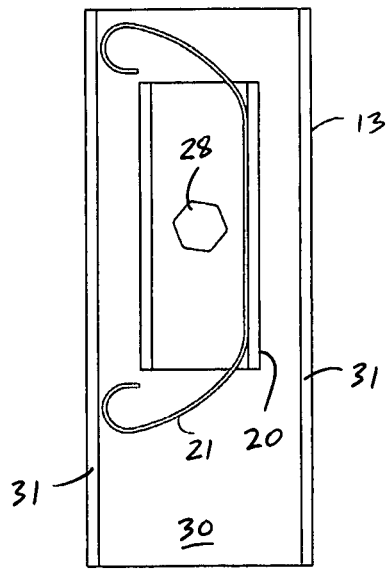
FIG. 4 is a top view of a roller assembly of a first embodiment of the anti-corkscrewing casing spacer.
Figure 5:
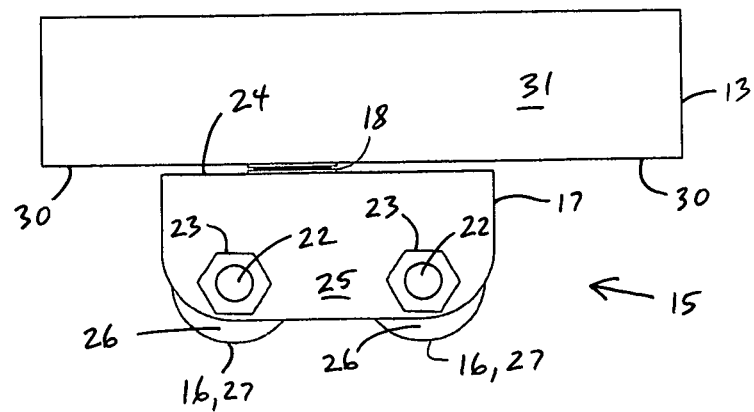
FIG. 5 is a side view of a roller assembly of a first embodiment of the anti-corkscrewing casing spacer.

As shown in FIGS. 2 and 5, bracket 17 of the first embodiment of roller assembly 15 is preferably connected to pivot limiter 20 using a rigid pivot connection 19. Pivot connection 19 can be a bolt 28 (shown in FIG. 4) and nut 29 combination, where bolt 28 preferably extends through a hole (not shown) in the center of pivot limiter 20, a hole (not shown) through the center of the top 30 of riser 13, a hole (not shown) through the center of thrust bearing assembly 18, and a hole (not shown) through bracket 17 that is slightly to the rear of the center of top 24 of bracket 17, as shown in FIG. 5. Once bolt 28 is extended through the hole (not shown) in the center of pivot limiter 20, through the hole (not shown) in the center of top 30 of riser 13, through the hole (not shown) in the center of thrust bearing assembly 18, and through the hole (not shown) that is slightly to rear of the center of top 24 of bracket 17 (as shown in FIG. 5), nut 29 can be used to rigidly connect bracket 17 to pivot limiter 20.

Figure 3:
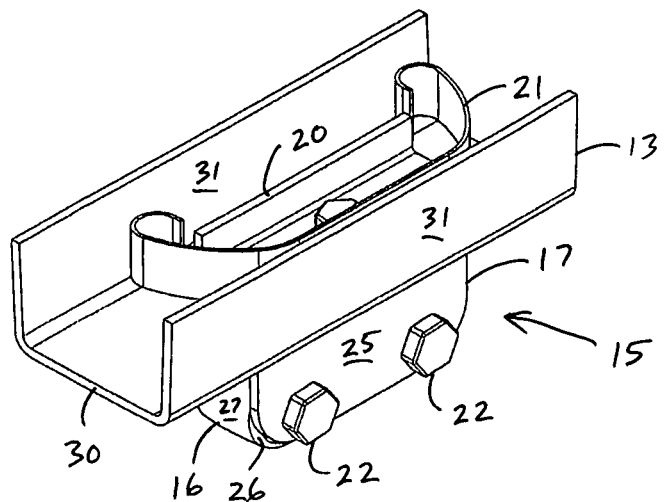
FIG. 3 is a perspective view of a roller assembly of a first embodiment of the anti-corkscrewing casing spacer.

As shown in FIGS. 2, 3, and 4, pivot limiter 20 and spring 21 are enclosed in a riser 13. As a carrier pipe 11 or set of carrier pipes 11 is pushed or pulled through a casing, carrier pipe 11 or set of carrier pipes 11 tends twist or corkscrew as it moves along the length of the casing. The twisting or corkscrewing action of carrier pipe 11 or set of carrier pipes 11 causes roller assemblies 15 to change direction as carrier pipe 11 or set of carrier pipes 11 moves along the length of the casing. Spring 21 applies force to the side 31 of riser 13 thereby keeping roller assemblies 15 from straying too far from a straight direction. As mentioned above, pivot connection 19 extends through bracket 17 slightly to the rear of the center of the top 24 of bracket 17, which causes the roller assembly 15 to pivot in a direction opposite the twisting or corkscrewing direction of carrier pipe 11 or set of carrier pipes 11 as it moves along the length of the casing. As carrier pipe 11 or set of carrier pipes 11 twists or corkscrews, roller assembly 15 will move and point in the opposite direction of the twisting or corkscrewing motion, resulting in a counter-force that will straighten carrier pipe 11 or set of carrier pipes 11 as it moves along the length of the casing. As the twisting or corkscrewing decreases, spring 21 will return roller assembly 15 towards a direction that is in line with the linear length of the casing spacer.

The second embodiment of roller assembly 15 is shown in FIGS. 1, 6, 7, and 8. As with the first embodiment of roller assembly 15, the second embodiment of roller assembly 15 is attached to a riser 13 that is attached to a casing spacer band 12 of a casing spacer 10, as shown in FIG. 1. The primary components of the second embodiment of roller assembly 15 include one or more wheels 42, a bracket 43, needle bearings 44, a wheel axle 45, and an axle nut 46.

Each wheel 42 of the second embodiment of roller assembly 15 is preferably made of an electrically isolating glass-filled polymer material using injection molding or some other molding process. As shown in FIG. 7, each wheel 42 preferably has two sides 47 and a rolling surface 48. In addition, each wheel 42 is preferably equipped with an inner surface 49 and needle bearings 44. Needle bearings 44 can be used in pairs or alone, depending on the weight of the load to be supported by roller assembly 15.

As shown in FIG. 7, bracket 43 preferably has a U-shaped cross-section with a top 50 and two opposing sides 51. Bracket 43 can be made from a sheet of metal such as raw steel or stainless steel. Bracket 43 can be cut or punched from the sheet of metal in the desired shape and then formed or bent into a U-shaped channel having a top 50 and two opposing sides 51, as shown in FIG. 7. Bracket 43 can also be made from three separate pieces of metal that are joined together into a U-shaped channel by welding or similar method. Bracket 43 is preferably shaped to provide adequate clearances between bracket 43 and the sides 47 and rolling surface 48 of each wheel 42, as shown in FIG. 7. Sides 51 of bracket 43 have holes 52 to accommodate a wheel axle 45 for each wheel 42 assembled onto bracket 43.

Figure 6:
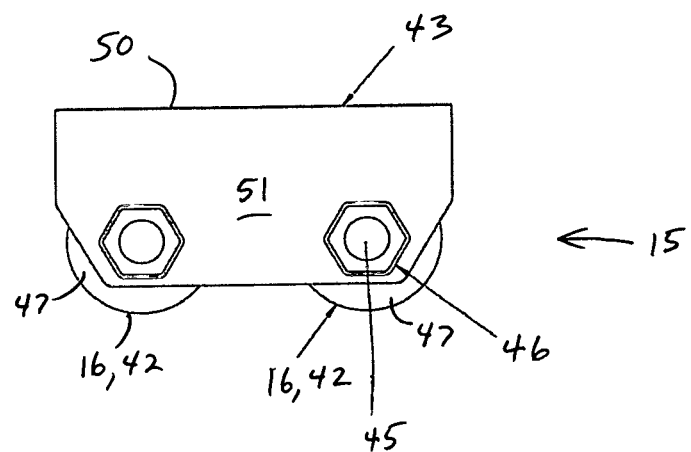
FIG. 6 is a side view of a roller assembly for a second embodiment of the anti-corkscrewing casing spacer.

As shown in FIGS. 6 and 7, each wheel 42 is assembled onto bracket 43 using a wheel axle 45 and an axle nut 46. Wheel axle 45 and axle nut 46 are preferably manufactured from metal, such as carbon steel or stainless steel. Wheel axle 45 has a shaft 53 for inserting through the holes 52 in the sides 51 of bracket 43 and through wheel 42. For each wheel 42 assembled onto bracket 43, shaft 53 of wheel axle 45 is inserted through a hole 52 in one of the sides 51 of bracket 43, then through wheel 42 so that the set of needle bearings 44 are between wheel axle 45 and inner surface 49 of wheel 42, and then through a hole 52 in the other side 51 of bracket 43. Shaft 53 is preferably threaded at its end so that axle nut 46 can be threaded onto shaft 53 to secure wheel axle 45 to bracket 43. Shaft 53 is preferably unthreaded between its threaded portion and the head 54 of wheel axle to provide an unthreaded rolling surface 55 for set of needle bearings 44. Unthreaded rolling surface 55 of shaft 53 of wheel axle 45 should be hard enough to prevent excessive wear from the rolling of the set of needle bearings 44.

Figure 8:
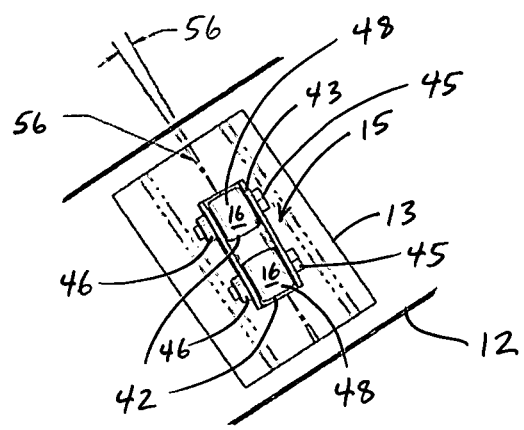
FIG. 8 is a bottom view of roller assembly for a second embodiment of the anti-corkscrewing casing spacer.

As shown in FIG. 8, bracket 43 of the second embodiment of roller assembly 15 is preferably connected to the top 30 of riser 13 at an outward angle 56 relative to the centerline of the direction of the carrier pipe 11 or set of carrier pipes 11 as it is pushed or pulled through a casing pipe. If bracket 43 is attached to a riser 13 to the right of the centerline of the direction of the carrier pipe 11 or set of carrier pipes 11 as it is pushed or pulled through a casing pipe, then bracket 43 is attached to riser 13 at an angle 56 right of the centerline. The preferred angle 56 is five degrees right of the centerline, but angle 56 can vary to optimize the directional guiding of the carrier pipe 11 or set of carrier pipes 11 without excessively hindering the force required to push or pull the carrier pipe 11 or set of carrier pipes 11 through the casing pipe. Likewise, if bracket 43 is attached to a riser 13 to the left of the centerline of the direction of the carrier pipe 11 or set of carrier pipes 11 as it is pushed or pulled through a casing pipe, then bracket 43 is attached to riser 13 at an angle left of the centerline. Again, the preferred angle 56 is five degrees left of the centerline, but angle 56 can vary to optimize the directional guiding of the carrier pipe 11 or set of carrier pipes 11 without excessively hindering the force required to push or pull the carrier pipe 11 or set of carrier pipes 11 through the casing pipe.

The wheels 42 attached to the angled-out brackets 43 on the multiple risers 13 work together to prevent the carrier pipe 11 or set of carrier pipes 11 from twisting or corkscrewing inside the casing pipe. Because the sliding friction of wheels 42 is much greater than the rolling friction of wheels 42, much greater force is required for wheels 42 to skid than to roll. As the carrier pipe 11 or set of carrier pipes 11 is pushed or pulled through the casing pipe, the wheels 42 on one roller assembly 15 will dictate control of the direction of the carrier pipe 11 or set of carrier pipes 11. If, for example, the wheels 42 on the bracket 43 that is angled to the right of the centerline of the direction of the carrier pipe 11 or set of carrier pipes 11 is dictating control of the direction of the carrier pipe 11 or set of carrier pipes 11, then the wheels 42 angled to the right of the centerline will travel slightly to the right and begin climbing the wall on the right side of the casing pipe as the carrier pipe 11 or set of carrier pipes 11 is being pushed or pulled through the casing pipe, thereby causing the carrier pipe 11 or set of carrier pipes 11 to twist or corkscrew slightly to the right within the casing pipe. As the wheels 42 angled to the right continue to climb the wall on the right side of the casing pipe and the carrier pipe 11 or set of carrier pipes 11 continues to twist or corkscrew to the right, the slope of the wall of the casing pipe increases. As the wheels 42 angled to the right continue to climb the wall of the casing pipe as the carrier pipe 11 or set of carrier pipes 11 is pushed or pulled through the casing pipe, the wheels 42 angled to the right begin to slide and the weight of the carrier pipe 11 or set of carrier pipes 11 shifts to the wheels 42 angled to the left. At that point, the wheels 42 angled to the left begin to dictate control of the direction of the carrier pipe 11 or set of carrier pipes 11 as the carrier pipe 11 or set of carrier pipes 11 is pushed or pulled though the casing pipe. As the wheels 42 angled to the left take control of the direction of the carrier pipe 11 or set of carrier pipes 11, the carrier pipe 11 or set of carrier pipes 11 twists or corkscrews to the left within the casing pipe. The wheels 42 angled to the left of the centerline will travel slightly to the left and begin climbing the wall on the left side of the casing pipe as the carrier pipe 11 or set of carrier pipes 11 is being pushed or pulled through the casing pipe, thereby causing the carrier pipe 11 or set of carrier pipes 11 to twist or corkscrew slightly to the left within the casing pipe. As the wheels 42 angled to the left continue to climb the wall on the left side of the casing pipe and the carrier pipe 11 or set of carrier pipes 11 continues to twist or corkscrew to the left, the slope of the wall of the casing pipe increases. As the wheels 42 angled to the left continue to climb the wall of the casing pipe, the wheels 42 angled to the left begin to slide and the weight of the carrier pipe 11 or set of carrier pipes 11 shifts to the wheels 42 angled to the right. At that point, the wheels 42 angled to the right begin to dictate control of the direction of the carrier pipe 11 or set of carrier pipes 11. This alternating process continues as the carrier pipe 11 or set of carrier pipes 11 is being pushed or pulled through the casing pipe, thereby preventing the carrier pipe 11 or set of carrier pipes 11 from continuing to twist or corkscrew in only one direction inside the casing pipe, and thereby keeping the carrier pipe 11 or set of carrier pipes 11 in the desired orientation as it is being pushed or pulled through the casing pipe.

It is understood that two embodiments of the present invention have been disclosed by way of example and that other modifications and alterations may occur to those skilled in the art without departing from the scope and spirit of the present invention.

What is claimed is:

1. An anti-corkscrewing casing spacer for installing on a carrier pipe or a set of carrier pipes, said casing spacer comprising a circular casing spacer band having an outer surface; a plurality of risers radially attached to said outer surface of said casing spacer band, each of said risers comprising a pivot limiter disposed therein, said pivot limiter having an elongated spring attached thereto, wherein said spring applies a force to the riser; the pivot limiter further including a pivot connection extending therethrough that connects the pivot limiter to a thrust bearing assembly located beneath the riser, said thrust bearing assembly being connected with a bracket and at least one wheel assembly, wherein said spring force applied to the riser returns the bracket and at least one wheel assembly to a straight direction following a pivoting movement of the bracket and at least one wheel assembly.

2. The anti-corkscrewing casing spacer of claim 1, where said circular casing spacer band comprises two or more semi-circular sections made of metal.

3. The anti-corkscrewing casing spacer of claim 2, where each semi-circular section of said circular casing spacer band has two opposite ends for connecting to other semi-circular sections, where said each of said two opposite ends is shaped into a flange with holes to receive fasteners for joining said end to another end of another semi-circular section.

4. The anti-corkscrewing casing spacer of claim 3, where each of said plurality of risers is made of metal.

5. The anti-corkscrewing casing spacer of claim 4, where said bracket is a U-shaped channel having a top and two opposing sides, said top of said bracket having a hole through which said pivot connection extends, said hole through said top of said bracket located to the rear of center of said top of said bracket, said two opposing sides having one or more sets of opposing holes, where each set of opposing holes is aligned with one another on opposing sides, where a wheel axle extends through each set of opposing holes for each wheel assembly assembled onto said bracket.

6. The anti-corkscrewing casing spacer of claim 5, where said bracket is made of metal.

7. The anti-corkscrewing casing spacer of claim 6, where said bracket is made from three separate pieces of metal that are welded together into a U-shaped channel.

8. The anti-corkscrewing casing spacer of claim 7, where each said wheel assembly comprises a wheel having a bore and an inner surface, said wheel rotatably placed between said two opposing sides of said bracket where said bore of said wheel is aligned with a set of opposing holes on said two sides of said bracket, where said wheel axle extends through said bore of said wheel and said set of opposing holes on said two sides of said bracket.

9. The anti-corkscrewing casing spacer of claim 8, comprising at least one needle bearing located between each said wheel axle and said inner surface of each said wheel.

10. The anti-corkscrewing casing spacer of claim 9, where each said wheel is molded from an electrically isolating glass-filled polymer material.

11. An anti-corkscrewing casing spacer for installing on a carrier pipe or a set of carrier pipes, said casing spacer comprising a circular casing spacer band having an outer surface, said carrier pipe or set of carrier pipes having a centerline of direction as it is being pushed or pulled through a casing pipe; a plurality of risers radially attached to said outer surface of said casing spacer band, each of said risers having a top; a bracket attached to said top of at least two risers, said bracket having at least one wheel assembly, where said bracket with accompanying at least one wheel assembly is attached to said top of said riser at an outward angle relative to said centerline of direction of said carrier pipe or set of carrier pipes as it is being pushed or pulled through said casing pipe.

12. The anti-corkscrewing casing spacer of claim 11, where said outward angle of said bracket with accompanying at least one wheel assembly is five degrees from said centerline of direction of said carrier pipe or set of carrier pipes as it is being pushed or pulled through said casing pipe, where two brackets are attached to two different risers on opposite sides of said centerline of direction of said carrier pipe or set of carrier pipes as it is being pushed or pulled through said casing pipe, with each bracket having at least one wheel assembly, where said brackets with accompanying wheel assemblies work together to prevent said carrier pipe or set of carrier pipes from continuing to corkscrew in only one direction inside said casing pipe as said carrier pipe or set of carrier pipes is being pushed or pulled through said casing pipe.

13. The anti-corkscrewing casing spacer of claim 12, where said circular casing spacer band comprises two or more semi-circular sections made of metal.

14. The anti-corkscrewing casing spacer of claim 13, where each semi-circular section of said circular casing spacer band has two opposite ends for connecting to other semi-circular sections, where said each of said two opposite ends is shaped into a flange with holes to receive fasteners for joining said end to another end of another semi-circular section.

15. The anti-corkscrewing casing spacer of claim 14, where each of said plurality of risers is made of metal.

16. The anti-corkscrewing casing spacer of claim 15, where said bracket is a U-shaped channel having a top and two opposing sides, said two opposing sides having one or more sets of opposing holes, where each set of opposing holes is aligned with one another on opposing sides, where a wheel axle extends through each set of opposing holes for each wheel assembly assembled onto said bracket.

17. The anti-corkscrewing casing spacer of claim 16, where said bracket is made of metal.

18. The anti-corkscrewing casing spacer of claim 17, where said bracket is made from three separate pieces of metal that are welded together into a U-shaped channel.

19. The anti-corkscrewing casing spacer of claim 18, where each said wheel assembly comprises a wheel having a bore and an inner surface, said wheel rotatably placed between said two opposing sides of said bracket where said bore of said wheel is aligned with a set of opposing holes on said two sides of said bracket, where said wheel axle extends through said bore of said wheel and said set of opposing holes on said two sides of said bracket.

20. The anti-corkscrewing casing spacer of claim 19, comprising at least one needle bearing located between each said wheel axle and said inner surface of each said wheel.

21. The anti-corkscrewing casing spacer of claim 20, where each said wheel is molded from an electrically isolating glass-filled polymer material.

22. An anti-corkscrewing casing spacer for installing on a carrier pipe or a set of carrier pipes, said casing spacer comprising a circular casing spacer band having an outer surface, said carrier pipe or set of carrier pipes having a centerline of direction as it is being pushed or pulled through a casing pipe; a plurality of brackets radially attached to said outer surface of said casing spacer band, each of said brackets having at least one wheel assembly, where each of said brackets with accompanying at least one wheel assembly is radially attached to said outer surface of said casing spacer band at an outward angle relative to said centerline of direction of said carrier pipe or set of carrier pipes as it is being pushed or pulled through said casing pipe.

23. The anti-corkscrewing casing spacer of claim 22, where said outward angle of each of said brackets with accompanying at least one wheel assembly is five degrees from said centerline of direction of said carrier pipe or set of carrier pipes as it is being pushed or pulled through said casing pipe.

24. The anti-corkscrewing casing spacer of claim 23, where at least one bracket with accompanying at least one wheel assembly is radially attached to said outer surface of said casing spacer band on one side of said centerline of direction of said carrier pipe or set of carrier pipes as it is being pushed or pulled through said casing pipe, and where at least one bracket with accompanying at least one wheel assembly is radially attached to said outer surface of said casing spacer band on the opposite side of said centerline of direction of said carrier pipe or set of carrier pipes as it is being pushed or pulled through said casing pipe, where said brackets with accompanying wheel assemblies on opposite sides of said centerline of direction of said carrier pipe or set of carrier pipes work together to prevent said carrier pipe or set of carrier pipes from continuing to corkscrew in only one direction inside said casing pipe as said carrier pipe or set of carrier pipes is being pushed or pulled through said casing pipe.

25. The anti-corkscrewing casing spacer of claim 24, where said circular casing spacer band comprises two or more semi-circular sections made of metal.

26. The anti-corkscrewing casing spacer of claim 25, where each semi-circular section of said circular casing spacer band has two opposite ends for connecting to other semi-circular sections, where said each of said two opposite ends is shaped into a flange with holes to receive fasteners for joining said end to another end of another semi-circular section.

27. The anti-corkscrewing casing spacer of claim 26, where each said bracket is a U-shaped channel having a top and two opposing sides, said two opposing sides having one or more sets of opposing holes, where each set of opposing holes is aligned with one another on opposing sides, where a wheel axle extends through each set of opposing holes for each wheel assembly assembled onto said bracket.

28. The anti-corkscrewing casing spacer of claim 27, where said bracket is made of metal.

29. The anti-corkscrewing casing spacer of claim 28, where said bracket is made from three separate pieces of metal that are welded together into a U-shaped channel.

30. The anti-corkscrewing casing spacer of claim 29, where each said wheel assembly comprises a wheel having a bore and an inner surface, said wheel rotatably placed between said two opposing sides of each of said brackets where said bore of said wheel is aligned with a set of opposing holes on said two sides of each of said brackets, where said wheel axle extends through said bore of said wheel and said set of opposing holes on said two sides of each of said brackets.

31. The anti-corkscrewing casing spacer of claim 30, comprising at least one needle bearing located between each said wheel axle and said inner surface of each said wheel.

32. The anti-corkscrewing casing spacer of claim 31, where each said wheel is molded from an electrically isolating glass-filled polymer material.

\* \* \* \* \*